United States Patent
Chen et al.

(10) Patent No.: US 8,494,522 B2
(45) Date of Patent: Jul. 23, 2013

(54) PICO CELL HOME MODE OPERATION

(75) Inventors: Xuming Chen, San Ramon, CA (US); Phillip Andrew Ritter, Danville, CA (US)

(73) Assignee: Cellco Partnership, Basking Ridge, NJ (US)

( * ) Notice: Subject to any disclaimer, the term of this patent is extended or adjusted under 35 U.S.C. 154(b) by 1284 days.

(21) Appl. No.: 11/896,160

(22) Filed: Aug. 30, 2007

(65) Prior Publication Data
US 2009/0061821 A1 Mar. 5, 2009

(51) Int. Cl.
*H04W 36/00* (2009.01)
*H04W 4/00* (2009.01)

(52) U.S. Cl.
USPC ............... 455/436; 455/432.1; 455/435.1

(58) Field of Classification Search
USPC .......... 455/41, 411, 412.1, 412.2, 414.1, 455/418–422.1, 432.1–449, 458, 550.1, 552.1, 455/553.1, 556.1, 556.2, 560, 561, 405–409; 370/310.2, 328, 338, 331–333, 352–356, 370/496, 522
See application file for complete search history.

(56) References Cited

U.S. PATENT DOCUMENTS

| | | | |
|---|---|---|---|
| 5,513,184 A | 4/1996 | Vannucci | |
| 5,864,549 A | 1/1999 | Honkasalo et al. | |
| 5,974,308 A | 10/1999 | Vedel | |
| 6,101,176 A | 8/2000 | Honkasalo et al. | |
| 6,836,653 B1 * | 12/2004 | Kang | 455/408 |
| 6,925,074 B1 * | 8/2005 | Vikberg et al. | 370/338 |
| 6,970,719 B1 | 11/2005 | McConnell et al. | |
| 7,929,970 B1 * | 4/2011 | Gunasekara et al. | 455/444 |
| 2002/0032034 A1 | 3/2002 | Tiedemann, Jr. et al. | |
| 2002/0151308 A1 | 10/2002 | Baba et al. | |
| 2003/0148774 A1 | 8/2003 | Naghian et al. | |
| 2003/0231586 A1 | 12/2003 | Chheda | |
| 2004/0204097 A1 | 10/2004 | Scheinert et al. | |
| 2005/0041650 A1 * | 2/2005 | O'Neill | 370/355 |
| 2005/0059390 A1 | 3/2005 | Sayers et al. | |
| 2005/0176421 A1 * | 8/2005 | Matenge et al. | 455/426.1 |
| 2005/0260973 A1 * | 11/2005 | van de Groenendaal | 455/411 |
| 2006/0111110 A1 | 5/2006 | Schwarz et al. | |
| 2006/0160565 A1 | 7/2006 | Singh et al. | |
| 2006/0215609 A1 | 9/2006 | Kyung et al. | |
| 2008/0009286 A1 | 1/2008 | Hur et al. | |

(Continued)

OTHER PUBLICATIONS

U.S. Appl. No. 11/892,330, Bao, Derek Hongwei et al., "Femto-BTS RF access mechanism," filed Aug. 22, 2007.

(Continued)

*Primary Examiner* — Jinsong Hu
*Assistant Examiner* — San Htun

(57) ABSTRACT

Identification of radio coverage of a mobile station (MS) via a pico cell, such as an IP-BTS in a user premises (e.g. residence or business customer location), enables a mobile/wireless service provider to differentiate between coverage under a pico cell and coverage under a macro network. In a disclosed example, when the MS requests registration/authentication through a pico cell, a related signaling message includes a pico cell identifier (pID). A home location register (HLR) is provisioned with a pID, so that the HLR can decide to accept or reject the registration/authentication requests. For example, if the particular MS is provisioned for services from a specific pico cell, the HLR will grant the registration/authentication and allow the network to process calls for the mobile station through the identified pico cell. This enables the provider to allow discounted services through pico cell, e.g. as a replacement for a landline.

18 Claims, 4 Drawing Sheets

U.S. PATENT DOCUMENTS

2008/0051088 A1* 2/2008 Tariq et al. .................. 455/436
2009/0047931 A1* 2/2009 Nanda et al. ................. 455/411
2009/0215429 A1* 8/2009 Caldwell et al. ............. 455/406

OTHER PUBLICATIONS

U.S. Appl. No. 11/896,355, Bao, Derek Hongwei et al., "Active service redirection for a private femto cell," filed Aug. 31, 2007.

International Search Report and Written Opinion of the International Searching Authority issued in PCT/US2008?0728886 dated Nov. 5, 2008.

International Search Report issued in International Patent Application No. PCT/US2008/072882 dated on Nov. 5, 2008.

Thadasina, N., "CDMA2000 1X Femtocell: Challenges Associated w/ Underlay Deployments," CDG Technology Forum, Dallas, Texas, May 2, 2007.

"WCDMA Ubicell Benefits," http://www.samsungnetwork.com, retrieved Jul. 18, 2007.

Thadasina, "CDMA2000 1X Femtocell Challenges Associated w/Underlay Deployments," CDG Technology Forum, Dallas, Texas, May 2, 2007.

"Samsung Introduces CDMA Base Station for Home Coverage at CTIA," Samsung Telecommunications America, LLC, Mar. 26, 2007.

"Your own mobile base station for home," inbabble.com, Feb. 10, 2007.

International Preliminary Report on Patentability issued in International Patent Application No. PCT/US2008/072886, mailed Mar. 11, 2010.

*Femto Cells: Personal Base Stations, An Overview*, Airvana; <http:www.aurvana.org/files/Femto__Overview__Whitepaper__FINAL__12-July-07.pdf>, Jul. 12, 2007.

* cited by examiner

PICO CELL HOME MODE OPERATION

TECHNICAL FIELD

The present subject matter relates to techniques and equipment to allow use of an IP-BTS or other implementation of a pico cell in a customer premises for customer premises-use only operation of a mobile station, for example, as a replacement for a landline telephone service to a home.

BACKGROUND

In recent years, use of mobile communications devices for voice telephone services, email or text messaging services and even multi-media service has become commonplace, among mobile professionals and throughout the more general consumer population. Mobile service provided through public cellular or PCS (personal communication service) type networks, particularly for voice telephone service, has become virtually ubiquitous across much of the world. In the USA, for example, competing public networks today provide mobile communications services covering most if not all of the geographic area of the country.

In addition to public networks, similar wireless technologies have provided relatively small scale networks for enterprise applications, typically offering wireless service analogous to private branch exchange (PBX) type service. Such a smaller scale private system includes several base stations, similar to but scaled down from those used in the public networks, in combination with a private circuit switch or more recently an Internet Protocol (IP) router or network, for providing communications between devices and with external networks. U.S. Pat. No. 6,970,719 to McConnell et al. and US application publication no. 2005/0059390 to Sayers et al. disclose examples of such private wireless cell phone networks. Although sometimes referred to as an "indoor cellular network" or "indoor system," such enterprise systems need not be literally indoors and for example may offer coverage across an entire campus area. Alternatively, such an enterprise cellular communication system may be referred to as a "pico-cell" system, with the outdoor public cellular communication system covering a wider area being referred to as a "macro-cell" system.

As broadband IP connectivity to homes and offices has become more common, and the speeds of packet-switched communications equipment and the speed of processors have increased, a variety of applications have emerged that utilize IP packet transport as an alternative bearer for voice communications. Generally, such applications are referred to as voice-over-packet services, however, the common forms based on Internet Protocol (IP) are referred to as "Voice over IP" or "VoIP" services. Although originally developed for wireline network transport through the Internet and through wireline intranets, VoIP services are now migrating to the wireless domain. Pico cell systems, which use IP routing or frame switching for IP transport, utilize VoIP technology to support the voice services.

As an extension of these developments/deployments into the customer premises, particularly for residential or small business applications, equipment manufacturers have recently begun offering versions of pico cell devices (sometimes alternately referred to as "femto" cell devices), for home or small business installation. In examples of these most recently developed pico cell systems, each device comprises a base transceiver system (BTS) forming a compact base station equipped with VoIP capability and an IP interface, for example, for connection to a digital subscriber line (DSL) modem or to a cable modem. The equipment forming the pico cell unit of this type may be referred to as an IP-BTS. One such unit in a home or small business, for example, would allow mobile station users in or near the premises to make and receive calls via the existing broadband wireline service from the customer's Internet Service Provider (ISP).

It has been suggested that the deployment of pico cells will be particularly advantageous to a carrier as a way to improve service of the carrier's macro network in customer premises locations where the macro network service is less than optimum. For example, if a mobile station user may have weak coverage at his or her residence, installation of an in the user's home effectively extends macro network coverage into that home in a manner that substantially improves the customer's experience using the carrier's network. At present, plans therefore are for the carrier(s) to distribute (sell or lease) the IP-BTS pico cell equipment to their public network customers.

However, the deployment strategy outlined above assumes the pico cell works with a regular mobile station that is similarly operable through the carrier's macro network. To a regular mobile station, the BTS of the pico cell appears like a normal base station of the macro network, and the network treats the communication service obtained through the pico cell much like any other service for the mobile station through a macro base station. Although service differentiation and competition with landline service have been proposed as possible justifications for widespread pico cell deployments, at present, there is no technique or mechanism to sufficiently distinguish mobile station operation through an affiliated or 'home' designated pico cell as might allow service differentiation between limited service coverage under such a pico cell from public mobile coverage via the macro network.

SUMMARY

The teachings herein improve over the existing pico cell communications, by adding one or more enhancements to identify the present radio coverage of a mobile station via a particular pico cell and/or a mobile station specifically associated with a particular pico cell. Identification of service through the pico cell and/or the associated mobile station enables a service provider to differentiate between coverage under a pico cell and coverage under the macro network. For example, the mobile station may be configured to operate in a 'home' only mode in which case it obtains service only through its associated pico cell and IP connection. For service limited only to the home pico cell coverage, the provider may charge a lower rate. The exemplary home only mode of operation provides a competitive alternative to a landline telephone service to the customer premises (residence or the like). However, the wireless service via the pico cell may allow the home user to obtain more advanced services features offered by the wireless carrier, such as text and multimedia messaging services, not readily available with landline telephone service.

Hence, an example of a method disclosed herein controls communication service for a mobile station through a pico cell of a mobile wireless communication network, which also include one or more macro cells. This first example involves receiving a signaling message relating to a request of the mobile station to register with the mobile wireless communication network through the pico cell. The signaling message includes an identification of the mobile station. Since the mobile station is attempting access through the pico cell, the signaling message also includes an identifier of the pico cell through which the mobile station requested to register with the network. A profile record associated with the mobile station is retrieved in response to the signaling message, from among customer records. In this first example, a determination is made of whether or not the pico cell identifier included in the signaling message matches a pico cell identifier if any indicated by the profile record associated with the mobile station.

If the mobile station that attempts registration through the pico cell is one associated with the particular pico cell, the pico cell identifier in the signaling message will match the identifier indicated by the profile record. However, records of other mobile stations will not indicate the matching identifier, and registration requests by such mobile stations will be rejected. Hence, the processing of the registration attempt through the pico cell entails granting or rejecting registration of the requesting mobile station through the identified pico cell, respectively, based on a determination of whether or not the pico cell identifier included by the signaling message matches a pico cell identifier if any indicated by the profile record associated with the mobile station.

Another exemplary method disclosed herein controls communication service for a mobile station, through a mobile wireless communication network including one or more macro cells and one or more pico cells. This example involves receiving a signaling message relating to a request of the mobile station to register with the network through a base transceiver system of one the cells of the network. A profile record associated with the mobile station is retrieved in response to the signaling message, from among the customer records. For purposes of this example, assume that the retrieved profile record indicates that the mobile station is authorized for service only through an identified pico cell of the network. Hence, the process involves determining whether or not a pico cell identifier if any included in the signaling message matches corresponds to the pico cell identified by the profile record associated with the mobile station.

If the mobile station is attempting registration through the appropriate pico cell, an identifier will be included in the signaling message, and that identifier will match the identifier indicated by the profile record. However, the signaling message may not include a pico cell identifier, if the mobile station is attempting to register through a base transceiver system of one the macro cells of the network. Also, the signaling message may include a pico cell identifier; but that identifier may not match the identifier indicated by the profile record, for example, in a case where the mobile station is attempting to register through a base transceiver system of a pico cell other than the one with which it is associated. Hence, the registration processing grants or rejects registration of the mobile station through the base transceiver system, respectively, based on the determination of whether or not a pico cell identifier if any included in the signaling message corresponds to the pico cell identified by the profile record associated with the mobile station.

With techniques such as discussed by way of example above, it becomes possible to restrict operation of a particular mobile station to communications through its associated pico cell. The registration and thus subsequent attempts at communications through the network via the pico cell are granted based on matching of a pico cell identifier included in the signaling message and a pico cell identifier indicated by the profile record associated with the mobile station, indicating that the mobile station authorized for service only through the specific pico cell is registering and thus communicating through the specific pico cell. The network may reject communications of other (non-associated) mobile stations through the pico cell of the home only mobile station. Registrations of the mobile station through other cells are rejected, blocking communications of the mobile station through the other cells. It then is possible for the network operator or carrier to bill a customer associated with the mobile station for the communications through the network via the specific pico cell in a manner different from billing for communications for other mobile stations through macro cells of the mobile wireless communication network. For example, the carrier may bill the customer for the communications through the network via the specific pico cell at a rate competitive with a landline telephone service.

Although outlined above in terms of processing methods or techniques, those skilled in the art will recognize that the concepts herein also encompass networks and components thereof that may implement any such processing.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various techniques and equipment disclosed herein enable identification of the present radio coverage of a mobile station via a pico cell, such as an IP-BTS in a 'home' user premises (e.g. residence or business customer location). Such identification of service through the pico cell enables a service provider to differentiate between coverage under the pico cell and coverage under the macro network.

Figures 1, 2:
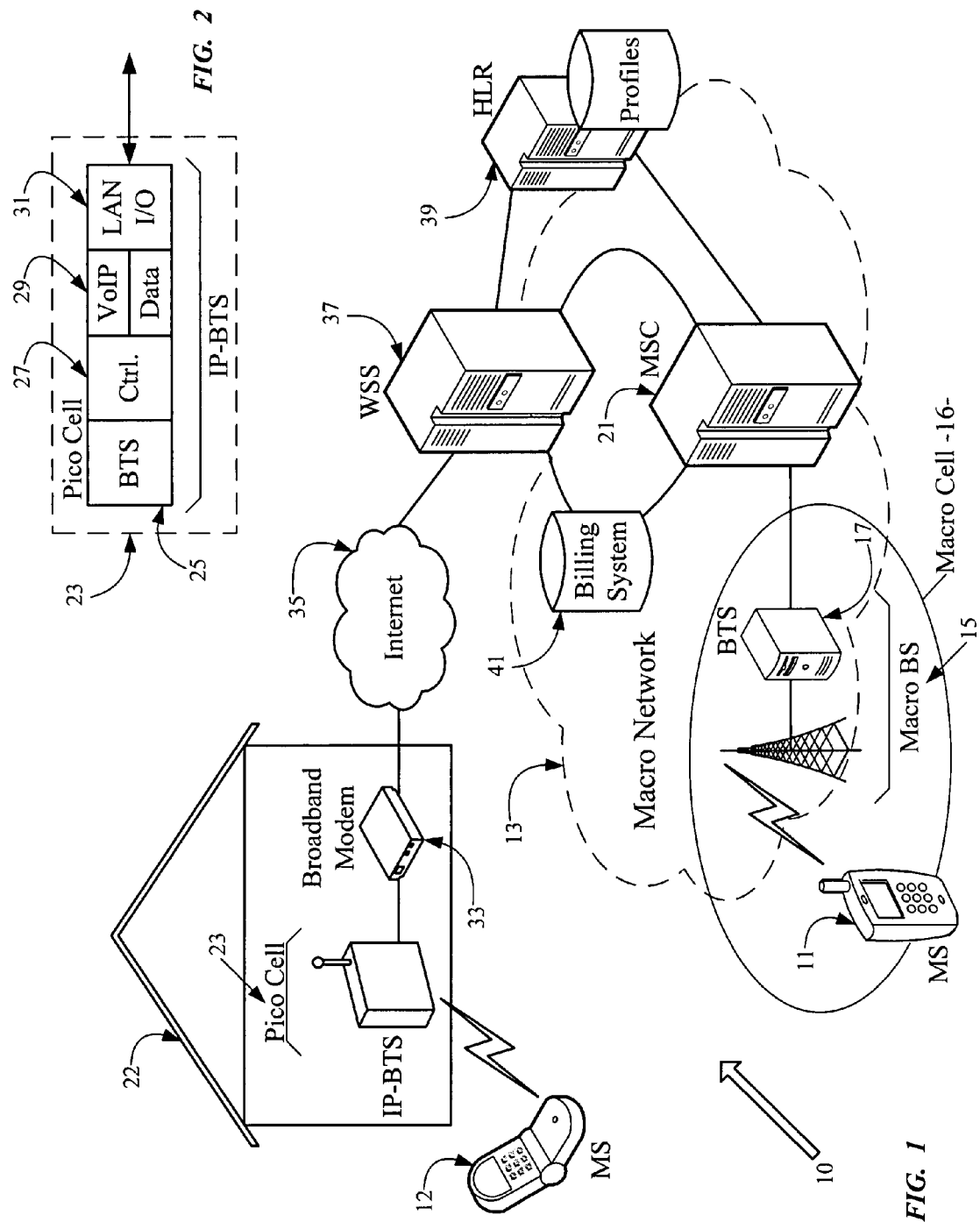
FIG. 1 is a simplified high-level diagram of a mobile communication system, including a macro network and an exemplary IP-BTS type pico cell.
FIG. 2 is a simplified functional block diagram of the customer premises IP-BTS equipment of the pico cell used in the system of FIG. 1.

To fully appreciate these concepts, it may be helpful first to consider a system offering wireless communication services via a macro public (mobile) network and pico cell type equipment. For that purpose, FIG. 1 is a functional block diagram of a system 10 of a carrier or network service provider for providing wireless communication services for mobile stations such as those shown at 11 and 12, using both macro cell public network equipment and pico cell equipment at customer premises locations. In the example, components of the carrier's system utilize some communications of another network, such as the Internet 35 or the PSTN (not shown), although those skilled in the art will recognize that any such other network is not necessarily part of the carrier's overall system or communication network 10 for providing mobile communication services to customers that use the mobile stations 11 and 12.

As illustrated, the carrier or network service provider operates the public macro cellular communication network 13 and provides mobile stations 11 to its mobile customers, i.e. so that the mobile station users obtain wireless communication services through the public macro network 13. For example, a user of a mobile station 11 can obtain service at any location covered by a cell 16 of the macro network 13, which offers the user a high degree of mobility. The overall network 10, in our example, includes elements shown in or associated with the macro network 13 as well as equipment for pico cells in customer premises.

Although the present concepts may be applied to other types of networks, the exemplary network 13 is a CDMA type network. The carrier also supplies pico cell equipment of a corresponding type, CDMA in our example, to some of its customers, for customer premises deployments. An example of a CDMA compatible IP-BTS is the UbiCell product by Samsung. The carrier may also operate some additional equipment (such as a soft switch as shown at 37) to support pico cell communications. In the illustrated example, the mobile station 12 is a mobile station designated for 'home' service through the pico cell system 23, whereas the mobile station 11 is a public service mobile station and appears in the first drawing at a location to receive service via a base station 15 of the macro network 13. Hence, in the example, the system or overall mobile wireless communication network associated with or operated by the carrier includes the macro network 13, the customers' mobile stations 11 and 12, the pico cells and any of the carrier's equipment that supports the pico cell communications. Such a system or overall network provides service in a number of pico cells 23 and in a number of macro cells 16 (represented generally by the ellipse), although only one of each is shown for convenience. The carrier's system 10 may utilize or communicate through other networks or systems not owned, operated or affiliated with the carrier or its system(s) or network(s), such as the public switched telephone network (PSTN) other carriers' mobile networks, or the public Internet 35.

In many areas today, one or more wireless service providers or carriers operate a macro network such as that shown generally at 13, to provide wireless mobile communications services over a radio airlink for mobile stations 11. Typically, such a macro network uses a 'cellular' architecture. A carrier providing service throughout the country will operate similar networks in various geographic regions. In some countries, particularly in the USA, a number of carriers operate two or more such networks and compete for providing services to mobile customers. For convenience, the example shows one such macro network 13, as a carrier might deploy equipment to serve a given geographic region or area.

For discussion purposes, the example shows a limited number of the elements of the carrier's macro network 13. Hence, in the example, the carrier operates a number of base stations (BSs) 15 in cells 16 and one or more mobile switching centers (MSCs) 19, to provide mobile wireless communication services to mobile stations 11 operating within areas or regions served by the radio coverage of the individual macro base stations 15. For convenience, the drawing show only one or the BS 15 and only one MSC 19. Each BS 15 typically includes an antenna system represented as a tower in the drawing and an associated base transceiver system (BTS) 17. The BTS 17 communicates via the antennae of the base station and over the airlink with the mobile stations 11, when the mobile stations are within range, i.e. operating with the coverage area of the cell 16.

The MSC 21 handles call routing and may provide special service features for mobile stations 11. Today, most versions of the MSC 19 provide circuit switched communications to/from mobile stations 11 and other networks or elements, although newer switching systems are being deployed that utilize packet switching technologies. Each wireless service provider's network typically includes a base station controller (BSC) functionality (not shown) that controls the functions of a number of the base stations 15 and helps to manage how calls made by each mobile station 11 are transferred (or "handed-off") from one serving base station to another. Each wireless network equipment vender implements this function differently. Some vendors have a physical entity, which they call a BSC, while other vendors include this functionality as part of their switch that forms the MSC 19. Each service provider's facilities may offer somewhat different services, e.g. voice call, text messaging, data or various combinations of these and other services. Also, the service providers will have different agreements in place as to how to treat each others' subscribers when roaming through the various networks.

In the example, the carrier's macro network 13 offers voice telephone service for and between mobile stations 11 and/or with mobile stations 12 operating through customer premises pico cells. Although not shown, those skilled in the art will recognize that such telephone service also includes voice calls between the mobile stations and landline telephones through the PSTN. Most modern networks also offer a variety of text and data services, although for ease of discussion, the example here focuses mainly on voice service calls.

The carrier operating the network 13 will also offer in-home or customer premises services via pico cell equipment, essentially as part of or as an extension of the carrier's network. The carrier may lease or sell the equipment to any number of customers in the area served by the macro network 13. Hence, the illustration shows that the system or overall network 10 includes equipment in a home or other premises 22 operating as a pico cell 23. Although one or more of the deployed pico cells may operate to provide public or private access to wireless mobile communication services of the carrier, for public mobile stations 11, in our example, the pico cell 23 is used as 'home' access for the mobile station 12. This means that the mobile station 12 will be granted service only when used through its designated 'home' pico cell 23. Although the same pico cell 23 could offer some level of access to other mobile stations 11 and/or 12, for our discussion, we will assume that access through the pico cell 23 is granted only for mobile stations 12 for which it is the 'home' pico cell.

As discussed in more detail, later, signaling for communications through the pico cell 23 will include an identification of radio coverage of a mobile station (MS) via that pico cell. The identification enables the carrier that provides the mobile/wireless service to differentiate between coverage under the pico cell 23 from that under the macro network 13. In the example, the mobile station 12 is configured to operate in a 'home' only mode in which it obtains service only through its associated pico cell 23. For that limited service, the carrier or service provider may charge a lower rate, e.g. lower than the rate charged to the user of mobile station 11 for public network services. However, the user of mobile station 12 may actually use that mobile station and the pico cell 23 as a replacement for landline telephone service to the customer premises 22 (residence or the like). The wireless service via the pico cell 23 allows the home user to obtain more advanced services features offered by the wireless carrier on the mobile station 23, such as text and multimedia messaging services, not readily available with landline telephone service.

Although other pico cell equipment could be used, as shown generally in FIG. 2, the exemplary pico cell equipment 23 comprises an IP-BTS. Such a device includes a base transceiver system (BTS) 25 for radio communications and an associated controller (Ctrl.) function 27 which generally controls operation of and communications through the pico cell 23. The pico cell BTS transceiver 25 and associated controller 27 are generally similar to those used in a public network base station, although the pico cell versions are scaled down for customer premises use. Over the airlink, the BTS 25 will appear identical to a public or macro network BTS 17, except for the power level and possibly the particular one of the licensed frequency bands on which the macro and pico BTSs operate.

Since the mobile stations and the interfaces/protocols used over the airlink are the same as used in the macro network 13, the mobile station communications may not be compatible with direct IP transport. Hence, the exemplary IP-BTS of the pico cell 23 also includes one or more interworking or protocol conversion functions for voice and/or data. For voice, for example, the IP-BTS will provide two-way conversions between the voice data format used by the mobile stations and BTSs and a Voice over IP (VoIP) packet format. The interworking functions 29 may be implemented by processing on the processor hardware that implements the controller (Ctrl.) 27 for the IP-BTS or on a separate processor (not shown).

The IP-BTS of the pico cell 23 further includes a packet communication interface. Although other arrangements or interface types are possible, the example uses a local area network (LAN) interface for data communication input/output (I/O). The LAN I/O interface 31 provides bi-directional packet communication with the customer's broadband modem 33. The broadband modem 33 may be, for example, a cable modem or a digital subscriber line (DSL) modem, a data device for communication over fiber, or the like. The present concepts also encompass arrangements that utilize wireless or fiber transport for IP packet services. Through the modem 33, the LAN interface 31 provides two-way IP packet communication (e.g. for VoIP) with a wide area packet data communication network, for the mobile communications through the IP-BTS. In the example of FIGS. 1 and 2, the LAN I/O interface 31 and the broadband modem 33 provide IP packet data transport, including VoIP transport, via a link to the public Internet 35, although private networks may be used.

Returning to the discussion of the overall system 10 of FIG. 1, the carrier will also operate a node, here referred to generically as a 'switch' for routing and/or controlling pico cell communications. The pico cell switch could be an MSC or other central office device. In the example using IP-BTS type pico cell equipment, each customer premises 22 having a pico cell 23 will have a link to a packet data network, in this example the Internet 35 provided for example via the broadband modem 33; therefore, to manage wireless calls via the pico cells 23, the carrier will also operate a server or other platform 37 providing a "soft switch" functionality. The wireless soft switch (WSS) 37 will appear as another mobile switching center to the MSC 21, e.g. via appropriate signaling and traffic communication links commonly used among MSCs. However, the WSS 37 communicates with the pico cells 23 via IP packet transport through the Internet 35. To facilitate such communications, the carrier may also operate a gateway or firewall (not shown), to provide security between the carrier's own private IP facilities, including the WSS 27, which communicate with the public Internet 35.

As for communications through the elements of the macro network 13, the carrier will provide a base station controller (BSC) functionality for calls going through the pico cells 23. This pico BSC functionality controls the functions of a number of IP-BTS type pico cell base stations, for example, to manage how calls to/from a mobile station are transferred (or "handed-off") from one serving base station to another, including handoffs to and from base stations 15 of the macro network 13. The BSC for pico cell calls could be implemented in the IP-BTS equipment, or it could be implemented as a separate physical element. However, for this example, we will assume that the WSS type switch 37 for pico cell call processing also performs functions of the BSC such as handoff control between various base stations.

The carrier operating the wireless network 13 also operates a home location register (HLR) 39 that stores subscriber profiles and related call processing control information for each of that carrier's wireless subscribers and their associated mobile stations 11, to which the carrier offers macro network service. Typically, the HLR 39 stores a customer profile record for each mobile subscriber station 11, which contains among other information the mobile directory number (MDN) for the mobile station, the mobile identification number (MIN) of the mobile station if different from the MDN, and information specifying the wireless services subscribed to by the mobile subscriber, such as voice service features, SMS, mobile web access, etc. For each mobile station 11, the record in the HLR 39 also contains data identifying the current point of attachment of the mobile station to the network 13, e.g. through a particular MSC 21. Network signaling keeps the point of attachment up to date as the user roams with the mobile station 11. For a system 10 including pico cells 23, the HLR 39 also will store similar records with regard to mobile stations 12 associated with home operations through a particular pico cell 23.

The HLR 39 may reside in an MSC 21, however, in the example, the HLR 39 resides in a centralized node sometimes referred to as a service control point (SCP). The HLR 39 communicates with the MSCs 21 via signaling data links, such as provided by an SS7 network (not shown) or other secure private data transport. The HLR 39 will also include data communication link(s) with the WSS switch 37, for similar processing with regard to mobile station registrations and calls through the pico cells 23.

From time to time, for example as a user roams, a mobile station 11 registers with the macro network 13, and the network 13 authenticates the mobile station 11, e.g. to check that the mobile station has a valid device number (MIN). In a typical implementation, the mobile station 11 attempts to register with an MSC 21 through a BTS 17, and the station 11 provides its identification information to the MSC 21. In response, the MSC 21 communicates with the HLR 39 that maintains the record for the respective station 11, to authenticate the mobile station 11. At that time, the MSC 21 will also assign a visitor location register (VLR) to the mobile station 11 temporarily store service profile information for that station in the assigned VLR. The signaling communication between the MSC 21 and the HLR 39 enables the HLR to update the stored location information for the respective mobile station in the associated profile record to indicate the mobile station's current point of attachment to the network 13, for use in directing subsequent incoming calls to the mobile station 11 through the MSC 21 that is currently serving that particular mobile station 11.

Similar techniques are used for registrations of mobile stations 11 or 12 through the pico cells and the WSS type switch 37. As discussed more below, to support differentiated operations for 'home' only mobile stations 12, the messaging identifies the pico cell 23; and the profile record associated with the mobile station 12 indicates home only service and indicates the particular pico cell 23 designated as the access point for that service for the mobile station 12. Hence, it may be helpful to consider a general discussion of registration for the mobile station 12.

In an example, the mobile station 12 attempts to register through the pico cell 23 with the WSS 37. To the mobile station 12, this is directly analogous to registration with a MSC 21. Hence, the mobile station requests registration through a BTS 25 and the Internet 35. The registration request identifies the particular mobile station, in this case, the 'home' only mobile station 12. In response, the WSS 37 communicates with the HLR 39 that maintains the record for the respective mobile station 12, to authenticate that mobile station. If successfully authenticated, the WSS 37 will assign a VLR to the mobile station 12 and temporarily store service profile information for that station received from the HLR 39 in the assigned VLR. The signaling communication between the WSS 37 and the HLR 39 also enables the HLR to update the stored location information for the respective mobile station in the associated profile record to indicate the mobile station's current point of attachment to the network 13, for use in directing subsequent incoming calls to the mobile station 12 through the WSS 37 and the pico cell 23 that is currently serving that particular mobile station 12.

To facilitate differentiation of service to mobile stations, as between service through a particular pico cell 23 and cells 16 of the macro network 13 and/or other pico cells, the system or overall network 10 implements the concept of a pico cell ID (pID). For example, a pico cell ID attribute is added in one or more of the registration/authentication messages with the HLR 39, used in the registration procedure for mobile stations attempting registration through a pico cell. The pico cell identifier (ID) or pID in such a signaling message serves to identify the present radio coverage of a mobile station 11 or 12. Identification of the pico cell during registration enables differential treatments of mobile stations 11 and 12 and enables the network 13 to allow communication services or not, e.g. for home-only mobile stations 12 and possibly for public mobile stations 11, under the different types of cell coverage. In the exemplary network 10, the pico cell identifier (pID) is also included in the customer profile record associated with a home only mobile station, provisioned in the HLR 39.

In operation, a mobile directory number (MDN) is associated with one or more pico cells 23 and through it with one or more mobile stations 12 designated for home-only operation through that pico cell 23. The pID identifying the pico cell 23 is provisioned in the HLR 39, along with the subscriber profile associated with the MDN, in essentially the same manner as normal provisioning for a mobile station 11. A mobile identification number (MIN) may also be assigned to the home pico cell 23 and its associated mobile station(s) 12, for call set-up signaling over the air link that may not use the MDN. However, the MDN and possibly the MIN are associated with the particular pico cell 23 and the mobile station(s) 12 of the home pico cell 23. The home operating mobile station(s) 12 do not have separately provisioned MDNs or MINs.

Based on the MDN, registration of the mobile station 12 with home mode operation from all regular MSCs 21 will be rejected, thus no service will be given to a home-only mobile station 12 via the macro network 13. However, registration from the controlling WSS switch 37 of the pico cells 23 will be passed to HLR 39 along with the pico cell ID. If the pico cell. ID is associated with the MDN used by the mobile station and thus included in the registration signaling, then the HLR 39 grants registration and service for the mobile station is enabled via the WSS 37 and the pico cell 23. If the pico cell ID is not associated with the MDN received in the registration signaling, then the HLR 39 rejects registration, and no service will be given to the mobile station through the particular pico cell.

For service through the pico cell 23, designated for home use by the mobile station 12, granting and rejecting registration is based on an identification of the pico cell 23 and a determination of whether or not the registering station is a mobile station authorized for communication via the identified pico cell 23. For such a registration, the signaling will provide an identifier of the pico cell through which the mobile station requested to register with the network. An authentication/authorization node of the network 10, the HLR 39 in our example, determines whether or not the pico cell identifier included in the signaling message matches a pico cell identifier if any indicated in the profile record associated with the mobile station requesting registration. The record for the mobile station 12 will include or point to the matching pico cell identifier, whereas the record for the mobile station 11 will not identify any specific pico cell. The record for another home only mobile station (not shown) will indicate a pico cell identifier, but such a recorded identifier will not match the identifier for the pico cell 23. The processing of registrations for network service through the pico cell 23 grants or rejects each registration of a mobile station, based on the determination of whether or not the pico cell identifier included in the signaling message matches a pico cell identifier if any indicated in the profile record associated with the registering mobile station. In our example, the registration of the mobile station 12 is granted, whereas the HLR 39 would reject registrations through the pico cell 23 by other mobile stations, including the public service mobile station 11 as well as any mobile stations authorized for home service only but in association with other pico cells.

The pico cell identification used in the illustrated system 10 also has an impact on macro network processing, essentially to control access by distinguishing the home only mobile station 12 from mobile stations such as 11 that are authorized for macro network access. This differentiation relies on determining, during registration, which type of mobile station 11 or 12 requested registration and granting or rejecting the registration accordingly. The logic of the HLR 39 will permit public network registrations of and thus service to the mobile station 11, whereas the HLR 39 will reject public network registrations of and thus service to the mobile station 12 because of its home only pico cell designation.

For a public service mobile station 11, the registration procedure through the macro network 13 will be unchanged. There will be no pID in the registration signaling when the mobile station 11 requests registration through a BTS 17 of a base station 15 in the macro network 13. However, the profile record associated with the mobile station 11 does not indicate home only service through a pico cell. If considered logically, the HLR will determine that the mobile station 11 is not limited to home only pico cell operation, therefore the HLR 39 will not block registration (and thus not block communication service) due to the lack of a pID in the signaling message(s). Assuming that the station 11 is a valid station of a subscriber of the carrier or of another service provider whose customers are permitted access through the macro network 13, the HLR 39 will grant registration requests for the mobile station 11; and that station 11 will be allowed to make and receive telephone calls and other communication services via the cell(s) 16 of the macro network 13.

For a mobile station 12 designated for home only operation through a pico cell 23, an authentication/authorization node of the network, the HLR 39 in our example, will determine the type of service for the mobile station 12. A method of this type, from the perspective of the node, would involve receiving a signaling message relating to a request of a mobile station to register with the overall mobile wireless communication network 10 through a base transceiver system of one of the cells 16 or 23 of the overall network 10. The HLR 39 retrieves a profile record associated with the mobile station requesting registration. Assume now that the registering mobile station is a home only mobile station 12. Hence, the retrieved profile record indicates that the mobile station 12 is authorized for service only through an identified pico cell of the network. Upon determining the home only designation for mobile station 12 that is requesting registration, the HLR looks for a matching pID of the designated home cell 23 for the station 12 in the registration request signaling message(s). Each requested registration for the mobile station 12 is granted or rejected, based on a determination of whether or not a pico cell identifier if any included in the signaling message corresponds to the pico cell 23 identified by the profile record associated with the mobile station 12. If the pID of pico cell 23 is included in the registration signaling, i.e. because the mobile station 12 is attempting registration through its associated pico cell 23, then the HLR 39 grants the registration request. However, if there is no specific pico cell identifier (e.g. because attempting registration through a macro network base station 15) or if a pico cell identifier included in the signaling message does not match that indicated by the profile record (e.g. because attempting registration through different pico cell), then the HLR 39 rejects the registration.

In the example, we assumed that the profile record for the mobile station 12 at least includes an identifier (pID) of the designated pico cell 23. The inclusion of such an identifier indicates that the mobile station is designated for home only operation and provides the pID for matching with the pID if any included in signaling messages relating to various attempts of mobile stations to register through the macro network 13, through the pico cell 23, and/or through other pico cells. Those skilled in the art will recognize that the registration logic and profile records may be implemented in other ways to determine whether or not a station 11 or 12 has the home only service and to obtain the pID (or a list of pIDs) for the pico cell(s) 23 through which a home only mobile station 12 is authorized to register and obtain network services.

The WSS 37 will produce usage records, such as call detail records, for calls conducted through pico cells, including calls through the pico cells 23 used for the home only services of mobile stations 12. The records will be similar to records produced by the MSCs 21 or other elements of the macro network 13 for regular mobile station traffic through the network 13. For billing purposes, the records will be forwarded to one or more record keeping and/or data processing systems used for generating bills, represented generally by the billing system 41 in FIG. 1. The billing system 41 runs a program to process the received records of calls of mobile stations 11 and 12 to produce bills for the respective customers in accordance will the service plans offered by the carrier that operates the overall network 10. Of note, the processing for the usage by mobile station 12 can be differentiated from that by the mobile station 11 to bill the respective customers different amounts for the differentiated services. For example, the respective customer or subscriber would receive a typical mobile service bill for network usage by the mobile station 11. However, the respective customer or subscriber would receive different bill, typically at a lower rate, for the home only service of mobile station 12 through the associated pico cell 23.

It may be helpful to consider operations for registration/call processing through the pico cell 23 in somewhat more detail, after which we will consider an example of operations for registration/call processing for the mobile station 12 through the macro network 13. Although the principles under consideration here may apply to other types of mobile station calls or sessions, for discussion purposes here will assume that the calls are telephone type calls for voice communications or the like. The examples discussed below (with respect to FIGS. 3-5) are simplified in that they show sufficient signaling for purposes of the examples, and those skilled in the art will appreciate that registration signaling and/or call-related signaling and communications may involve a variety of other transmissions between the various elements.

Figure 3:
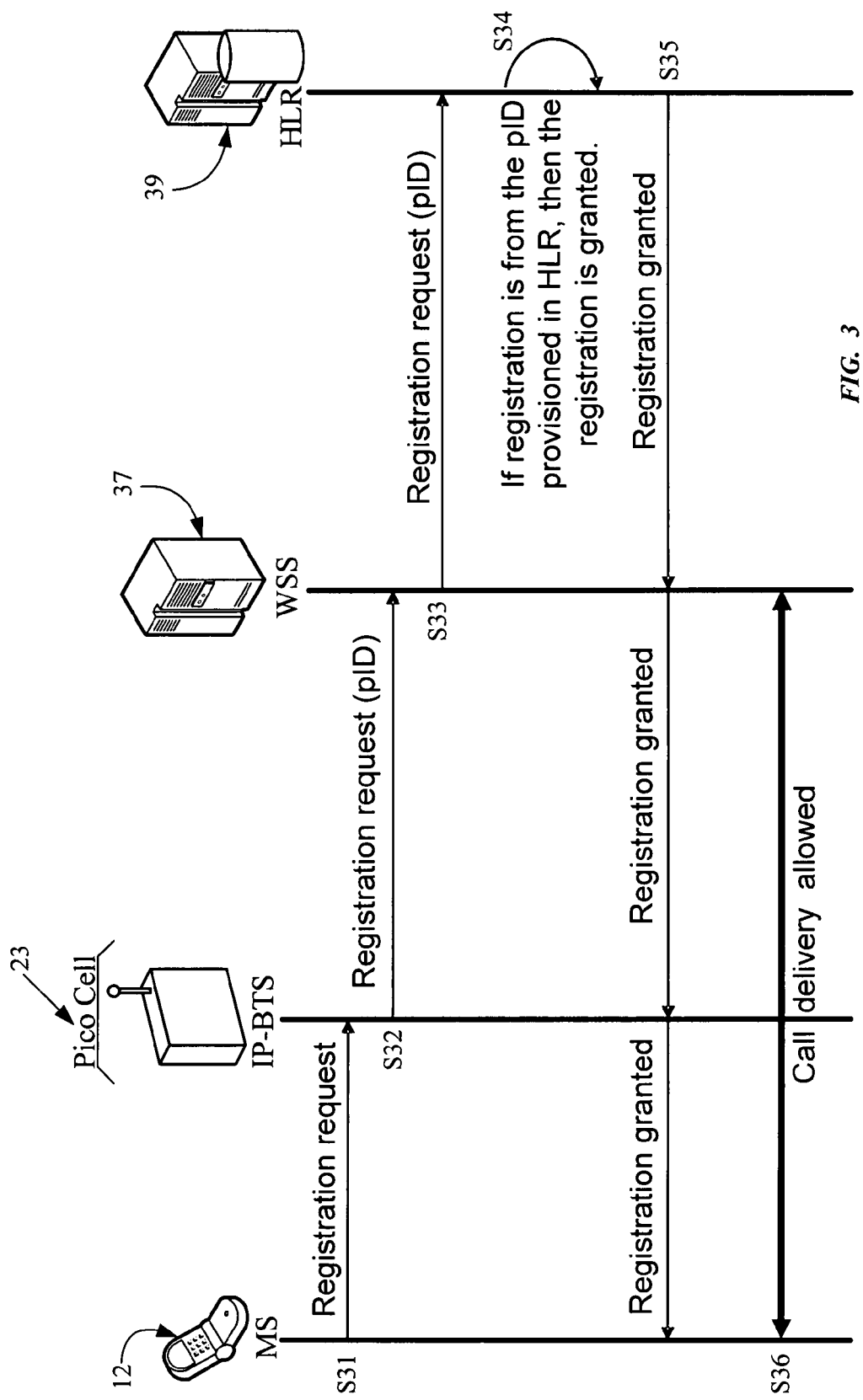
FIG. 3 is a simplified signal flow diagram useful in understanding the processing of mobile station registration and a subsequent call for a mobile station through a pico cell, in which the mobile station is a station associated with the particular pico cell.

We will consider first the simplified signal flow diagram of FIG. 3, which represents the processing of a mobile station registration and a subsequent call for a mobile station through a pico cell 23, in which the mobile station is a station 12 associated with the particular pico cell 23 for home only operation. In the example, the mobile station 12 sends a registration request over the airlink to the IP-BTS of the pico cell 23 (S31). The mobile station 12 is structurally a normal mobile station essentially the same as mobile station 11, and the signaling between the BTS 25 of the pico cell 23 and the mobile station 12 can use a standard protocol.

The controller 27 of the IP-BTS will process the registration request from the mobile station to formulate a corresponding request for communication upstream, in the applicable protocol. Of note for purposes of this discussion, the responsive registration message formulated in the IP-BTS is enhanced with the addition of a pico cell identifier (pID), which in the example of FIG. 3 contains the pID for the particular pico cell 23 receiving the registration request message from the mobile station 12. Hence, at step S32, the IP-BTS 23 of the pico cell 23 sends a registration request containing information about the mobile station 12 and containing the pID of the cell 23, through the Internet 35 to the WSS 37. Although there may be some protocol conversion, the WSS 37 forwards the registration request, including the mobile station information and the pID of the pico cell 23 to the HLR 39 (step S33).

The HLR 39 uses the mobile station information to look into its database of mobile station associated profile records to attempt to authenticate the mobile station that is requesting registration. In this example, the HLR 39 will retrieve a profile record for the mobile station 12. For this discussion, we will assume that the mobile station 12 is a valid customer station of the carrier operating the macro network 13 and the affiliated pico cells. As taught herein, the HLR 39 is configured to detect that the profile record for the mobile station includes a pico cell identifier for the pico cell with which the station 12 is associated and to compare that recorded identifier with the pID value included in the registration request message it received from the WSS 37. In this example, the pID value matches the identifier of home pico cell 23 stored in the HLR record for this particular mobile station 12. Essentially, if the registration request is from the pico cell having the pID provisioned in HLR 39 for home service to the mobile station 12, then the registration is granted (step S34).

Upon granting the registration after the determination in step S34, the HLR 39 sends back an appropriate signaling message informing the WSS 37, which is passed through to the IP-BTS of the pico cell 23, which in turn informs the mobile station 12 by appropriate signaling over the airlink (as shown collectively at step S35).

Since the registration procedure successfully authenticated the mobile station 12 for operation through the pico cell 23, the WSS 37 assigns a VLR to the mobile station 12 and temporarily stores service profile information for that station received from the HLR 39 in the assigned VLR. The signaling communication between the WSS 37 and the HLR 39 also enables the HLR to update the stored location information for the respective mobile station in the associated profile record to indicate the mobile station's current point of attachment to the overall network 10, for use in directing subsequent incoming calls to the mobile station 12 through the WSS 37 and the pico cell 23 that is currently serving that particular mobile station 12. So long as the registration through the pico cell 23 persists, the WSS 37 and HLR 39 will allow calls to and from the mobile station 12, as shown generally at S36 in FIG. 3. As noted earlier, the WSS 37 provides call detail records for mobile station calls through pico cells to the carrier's billing system 41, for processing to generate customer bills or otherwise bill customer accounts. Postpay and/or prepaid types of billing may be supported. Calls for the mobile station 12 through the pico cell 23 can be billed at a home service rate, which may be competitive with landline telephone service in the region of the premises 22.

For the service of the home only mobile station 12 through the pico cell 23, as allowed at S36, the operator of the overall wireless communication network can bill the customer at a rate that is different from the rate(s) charged for normal mobile service through the macro network portion 13 of the carrier's overall network 10. For example, the billing for the service to station 12 through the pico cell 23 might be at a flat monthly rate somewhat lower than landline services offered by local exchange competitors in the area, whereas the carrier might bill the user of mobile station 11 a minimum monthly fee (probably somewhat higher) plus certain usage charges (e.g. for calls to/from off-plan destinations, peak hour usage over some threshold, etc.).

Figure 4:
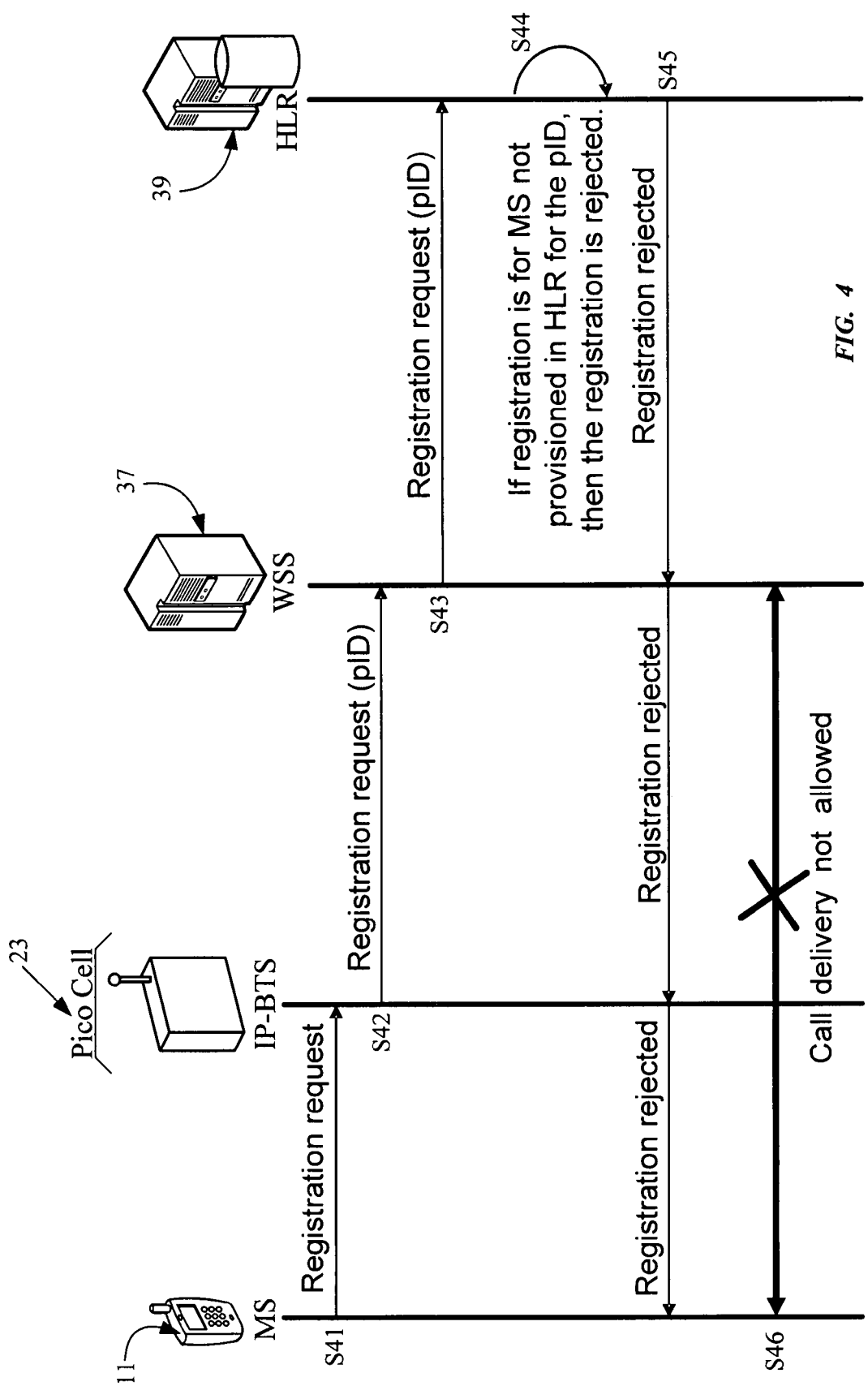
FIG. 4 is a simplified signal flow diagram useful in understanding the processing of mobile station registration and a subsequent call for a mobile station through a pico cell, in which the mobile station is a station that is not associated with the particular pico cell.

Next, we will consider the simplified signal flow diagram of FIG. 4, which represents the processing of mobile station registration and a subsequent call for a mobile station through a pico cell, in which the mobile station is a station 11 that is not associated with the particular pico cell. In this second example, the mobile station 11 has entered an area in or near the premises 22, and RF conditions are such that has attempted an idle state handoff into coverage of the pico cell 23. To the mobile station 11, the BTS 25 of the pico cell 23 appears similar to a BTS 17 of the macro network 13. The signaling between the BTS 25 of the pico cell 23 and the mobile station 11, for example, uses the standard protocol of the macro network 13. Under such circumstances, the mobile station 11 sends a registration request over the airlink to the IP-BTS of the pico cell 23 (S41).

As in the previous example, the controller 27 of the IP-BTS will process the registration request from the mobile station to formulate a corresponding request for communication upstream, in the applicable protocol. The responsive registration message formulated in the IP-BTS includes information about the requesting mobile station, but in this case, that information identifies the public mobile station 11. As in the earlier example, the registration message formulated in the IP-BTS includes the pico cell identifier (pID) for the particular pico cell 23 receiving the registration request message from the mobile station 11. Hence, at step S42, the IP-BTS 23 of the pico cell 23 sends a registration request identifying the mobile station 11 and containing the pID of the cell 23, through the Internet 35 to the WSS 37. Again, although there may be some protocol conversion, the WSS 37 forwards the registration request, including the mobile station information and the pID of the pico cell 23 to the HLR 39 (step S43).

The HLR 39 again uses the mobile station information to look into its database of mobile station profile records to attempt to authenticate the mobile station that is requesting registration through the pico cell 23. The HLR 39 will retrieve a profile record for the mobile station 11. The mobile station 11 is a valid customer station of the carrier operating the macro network 10 and associated pico cells. In this example, although the registration requested received by the HLR 39 includes a pID, the profile for the station 11 may not include a pID or may include a default value, because the public mobile station 11 is not associated with any pico cell. Similar situations may arise where the mobile station associated customer profile record does have a pico cell identifier; but the identifier is different from the pID received in the present registration request, e.g. because the mobile station is a home only station but is associated with a different pico cell.

In any case where the registration request received by the HLR 39 includes a pID, but that pID value does not match a value if any included in the record for the station requesting registration through the particular pico cell 23, the logic of the HLR 39 will detect that the mobile station is not provisioned for the particular pID (no match). As a result, the HLR 39 will reject the registration request at step S44. Hence, the HLR 39 sends back an appropriate signaling message informing the WSS 37 that it has rejected the registration of mobile station 11, and the message (or related signaling) is passed through to the IP-BTS of the pico cell 23, which in turn informs the mobile station 11 by appropriate signaling over the airlink (as shown collectively at step S45). Any subsequent attempts by the mobile station 11 to make a call via the pico cell 23 or any incoming calls that otherwise might be delivered to the mobile station 11 via the pico cell 23 will be disallowed and not go through, as shown generally at S46 in FIG. 4. Hence, the carrier can prevent the public mobile station 11 from obtaining service through the pico cell designated for the home only service on the mobile station 12.

Figure 5:
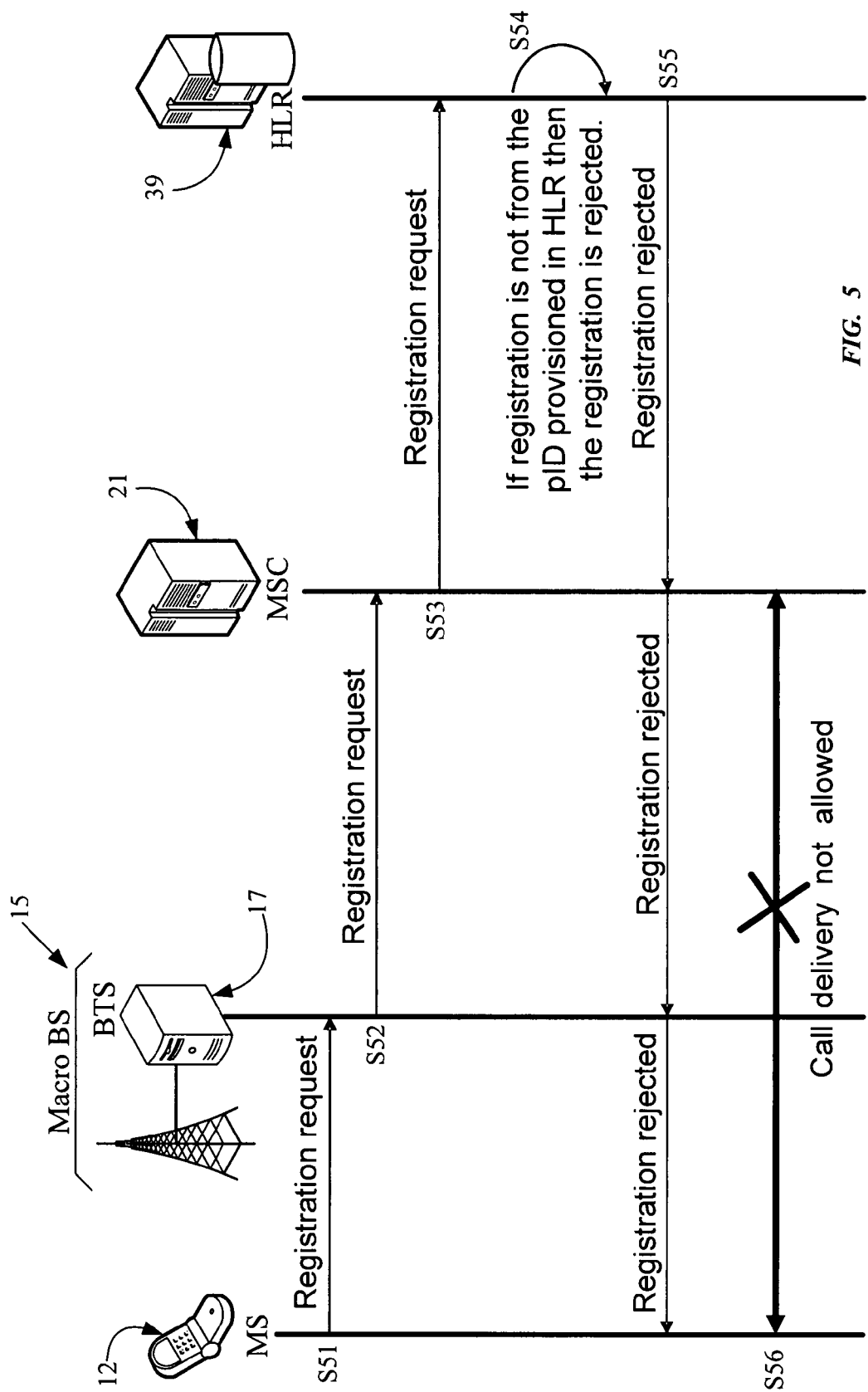
FIG. 5 is a simplified signal flow diagram useful in understanding the processing of mobile station registration and a subsequent call for a mobile station through elements of the macro network, in which the mobile station is a station designated for home only operation through a specified pico cell (not through the macro network).

Now, we will consider the simplified signal flow diagram of FIG. 5 which represents the processing of mobile station registration and a subsequent call for a mobile station through elements of the macro network 13 in which the mobile station is a station 12 designated for home only operation.

In the third example, assume that the user of the mobile station 12 has roamed out of range of the pico cell 23 in the premises 22. As noted, the mobile station 12 is structurally a normal mobile station essentially the same as mobile station 11. Hence, the mobile station 12 uses a standard signaling protocol to register through any BTS. To such a mobile station 12, a BTS 17 of a macro base station 15 appears the same as any other BTS (e.g. the same as the IP-BTS of the pico cell 23). Hence, when the RF conditions dictate (when out of range of the pico cell in our example), the mobile station 12 sends a registration request over the airlink to the macro BTS 17 of the public macro base station 15 (S51).

The BTS 17 (of base station BS 15) and the MSC 21 forward appropriate registration request signaling to the HLR 39, in the normal manner used in the macro network 13, as represented at steps S52 and S53 in FIG. 5. Of note for purposes of this discussion, since the mobile station 12 is attempting a registration via the macro network 13, the registration message(s) do not include a pico cell identifier. However, the signaling does identify the mobile station 12 that is now requesting registration through the base station 15 and the MSC 21 of the macro network 13. The registration signaling typically will identify one or elements of the macro network 13, such as the particular MSC 21.

When the HLR 39 receives the registration request at S53, the HLR 39 uses the mobile station information to look into its database of mobile station associated profile records to attempt to authenticate the mobile station. In this third example, the HLR 39 will again retrieve a profile record for the mobile station 12. The mobile station 12 is a valid customer station of the carrier operating the macro network 10 and associated pico cells. However, the profile record associated with that station includes an indication that the station 12 is designated for home only service, e.g. in the form of an entry of a pID value for the pico cell 23 in that station's record. Hence, upon retrieving such a record, the logic of the HLR 39 will determine that registration through the macro network 13 for the station 12 should be blocked. Hence, in this example, if the registration request for mobile station 12 does not include the pID from the pico cell 23 as provisioned in the HLR 39 (in this case because the registration attempt is through the macro network), then the registration is rejected (step S54).

Hence, the HLR 39 sends back an appropriate signaling message informing the MSC 22 that it has rejected the registration of mobile station 12, and the message (or related signaling) is passed through to the macro base station (BS) 15, which in turn informs the mobile station 12 by appropriate signaling over the airlink (as shown collectively at step S55). Any subsequent attempts by the mobile station 12 to make a call via the macro network 13 or any incoming calls that otherwise might be delivered to the mobile station 12 via the macro network 13 will be disallowed and not go through, as shown generally at S56 in FIG. 5. Hence, the carrier can prevent the home-only mobile station 12 from obtaining service through the macro network 13.

The use of the pico cell identification in the processing of various registration/authentication requests enables the network operator to allow a user of a mobile station 12 to receive service at a home premises 22 (residence, office or the like) via a pico cell 23, so that the one mobile station 12 can make and receive calls at the home premises, although the network 13 will block the services once the mobile station 12 moves beyond that location 22. The home location mobile station 12 can replace a fixed line phone. Yet the carrier can offer services/features to the station 12 at that location 22 the same as or similar to those offered to stations 11 having normal macro network access privileges, such as central voice mail (no need for voice recorder anymore), text and picture message services, on the home phone 12. The 'home' mobile station 12 is naturally cordless—it operates much like a cordless telephone coupled to a landline. The billing rate for the home only service can be competitive with (e.g. around or below) the rate for landline service. In this way, the home operation through the pico cell 23 can compete with fixed telephone line operators using mostly existing infrastructure and core wireless network.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

BS—Base Station
BSC—Base Station Controller
BTS—Base Transceiver System
CDMA—Code Division Multiple Access
DSL—Digital Subscriber Line
HLR—Home Location Register
ID—Identifier
IP—Internet Protocol
IP-BTS—Internet Protocol—Base Transceiver System
I/O—Input/Output
ISP—Internet Service Provider
MDN—Mobile Directory Number
MIN—Mobile Identification Number
MS—Mobile Station
MSC—Mobile Switching Center
PBX—Private Branch Exchange
pID—Pico Cell Identifier
PSTN—Public Switched Telephone Network
RF—Radio Frequency
SCP—Service Control Point
VLR—Visitor Location Register
VoIP—Voice over Internet Protocol
WSS—Wireless Soft Switch

What is claimed is:

1. A method of controlling communication service for a mobile station, the method comprising steps of:
  receiving a first signaling message relating to a request of the mobile station to register with a mobile wireless communication network including one or more macro cells and one or more pico cells, wherein the pico cells connect to the mobile wireless communication network through a packet data network, the first signaling message being received through a base transceiver system of one of the pico cells of the network;
  responsive to the first signaling message, retrieving, from among a plurality of profile records for customers, a profile record associated with a mobile directory number (MDN) or mobile identification number (MIN) provisioned to a plurality of mobile stations including the mobile station, the retrieved profile record indicating that each mobile station of the plurality of mobile stations is authorized for service only through an identified pico cell of the network;

determining whether or not a pico cell identifier included in the first signaling message corresponds to the pico cell identified by the profile record associated with the MDN or MIN provisioned to the plurality of mobile stations including the mobile station;

granting or rejecting registration of the mobile station through the pico cell, respectively, based on the determining of whether or not the pico cell identifier corresponds to the pico cell identified by the profile record associated with the MDN or MIN provisioned to the plurality of mobile stations including the mobile station;

receiving a second signaling message relating to a request of the mobile station to register with the network through a base transceiver system of one of the macro cells of the network;

in response to receiving the second signaling message through one of the macro cells, determining that the mobile station is not authorized for use through the one or more macro cells of the network based on the indication in the retrieved profile record that each mobile station of the plurality of mobile stations is authorized for service only through the identified pico cell connecting to the mobile wireless communication network through the packet data network; and rejecting registration of the mobile station through the one macro cell based on the determining that the mobile station is not authorized for use through macro cells of the network.

2. The method of claim 1, further comprising:

granting or rejecting attempts at communications through the network for the mobile station via the pico cell, respectively, based on the granting or rejecting of the registration of the mobile station through the pico cell; and granting or rejecting attempts at communications through the network for the mobile station via the macro cell, respectively, based on the granting or rejecting of the registration of the mobile station through the macro cell.

3. The method of claim 1, wherein:

the registration and attempts at communications through the network via the pico cell are granted based on matching of a pico cell identifier included in the first signaling message and a pico cell identifier indicated by the profile record associated with the MDN or MIN provisioned to the plurality of mobile stations including the mobile station, the pico cell identifier indicated by the profile record associated with the MDN or MIN provisioned to the plurality of mobile stations including the mobile station indicating that the mobile station authorized for service only through the identified pico cell is registering for communication through the identified pico cell; and the method further comprises billing a customer associated with the mobile station for the communications through the network via the identified pico cell in a manner different from billing for communications for other mobile stations through a macro cell of the mobile wireless communication network.

4. The method of claim 3, wherein the billing for the communications through the network via the identified pico cell is competitive with a landline telephone service.

5. The method of claim 1, wherein:

the mobile directory number (MDN) is assigned to each mobile station of the plurality of mobile stations; and the retrieved profile record provides an association of the MDN to the identified pico cell.

6. The method of claim 5, wherein the mobile station communicates with the base transceiver system of the pico cell and with the base transceiver system of the macro cell using the same mobile wireless communication protocol.

7. The method of claim 1, wherein the mobile station communicates with the base transceiver system of the pico cell and with the base transceiver system of the macro cell using the same Code Division Multiple Access (CDMA) technology.

8. A system offering mobile communications services for mobile stations, the system comprising:

a macro network providing wireless public mobile communications services, the macro network comprising macro cells for providing wireless communications with mobile stations and a mobile switching center for routing and controlling calls for mobile stations through the macro cells;

a plurality of pico cells installed in customer premises, each for wireless communications with one or more of the mobile stations, wherein each pico cell connects to the macro network through a packet data network;

a switch in communication with the pico cells for routing and controlling calls for mobile stations through the pico cells; and an authentication node in signaling communication with the mobile switching center of the macro network and the switch in communication with the pico cells, wherein the authentication node is configured for implementing functions comprising:

a) receiving a first signaling message relating to a request, of one of the mobile stations having been designated for home pico cell operation only, to register with the macro network through a base transceiver system of one of the pico cells, the first signaling message including a pico cell identifier of the one pico cell and being received through the switch;

b) granting registration of the one mobile station through the base transceiver system of the one pico cell, responsive to a determination that the pico cell identifier in the first signaling message corresponds to a pico cell identified as a home pico cell for the one mobile station by a profile record associated with a mobile directory number (MDN) or mobile identification number (MIN) provisioned to a plurality of mobile stations including the one mobile station and that identifies each of the plurality of mobile stations including the one mobile station as being designated for operation only through the identified pico cell;

c) receiving a second signaling message relating to a request of the one mobile station to register with the macro network through a base transceiver system of one the macro cells, the second signaling message being received through the mobile switching center of the macro network; and d) rejecting registration of the one mobile station through the base transceiver system of the one macro cell as a result of determining that the mobile station is not authorized for use through the macro cells of the network based on a pico cell identifier in the profile record associated with the mobile directory number (MDN) or mobile identification number (MIN) provisioned to the plurality of mobile stations including the one mobile station and that identifies each of the plurality of mobile stations including the one mobile station as being designated for operation only through the identified pico cell.

9. The system of claim 8, wherein the authentication node is configured for implementing additional functions comprising:
   e) receiving a third signaling message relating to a request of another mobile station to register with the macro network through a base transceiver system of the one pico cell, the third signaling message including the pico cell identifier of the one pico cell; and
   f) rejecting registration of the other mobile station through the base transceiver system of the one pico cell, responsive to a determination that the pico cell identifier in the third signaling message does not correspond to a pico cell, if any identified by a profile record associated with a MDN or MIN provisioned to the other mobile station and different from the MDN or MIN provisioned to the plurality of mobile stations.

10. The system of claim 9, further comprising a billing system configured to:
    receive call detail records for calls of the one mobile station through the one pico cell and for calls of the other mobile station through the system; and
    to process the received call detail records to generate communication service bills for respective customers associated with the one mobile station and the other mobile station, at different rates.

11. The system of claim 10, wherein the billing system is configured to generate the bill for the respective customer associated with the one mobile station at a rate competitive with landline telephone service.

12. The system of claim 8, wherein the base transceiver system of the pico cell and the base transceiver system of the macro cell communicate with the mobile stations using the same mobile wireless communication protocol.

13. The system of claim 8, wherein the base transceiver system of the pico cell and the base transceiver system of the macro cell communicate with the mobile stations using the same Code Division Multiple Access (CDMA) technology.

14. A method of controlling communication service for a mobile station, the method comprising steps of:
    receiving a signaling message relating to a request of the mobile station to register with a mobile wireless communication network including macro cells and a pico cell, the signaling message being received through a base transceiver system of the pico cell of the network;
    responsive to receiving the signaling message, retrieving a profile record associated with a mobile directory number (MDN) or mobile identification number (MIN) provisioned to a plurality of mobile stations including the mobile station from among a plurality of profile records for customers, the retrieved profile record indicating that each mobile station of the plurality of mobile stations is authorized for service only through an identified pico cell of the network; and
    granting or rejecting registration of the mobile station through the pico cell based on determining, respectively, whether or not a pico cell identifier included in the signaling message corresponds to the pico cell identified by the profile record associated with the MDN or MIN provisioned to the plurality of mobile stations including the mobile station,
    wherein the mobile station and the base transceiver system of the pico cell communicate using a Code Division Multiple Access (CDMA) technology protocol used by both the pico cell and the macro cells, and the base transceiver system of the pico cell converts communications between the CDMA protocol and an internet protocol (IP).

15. The method of claim 14, further comprising granting or rejecting attempts at communications through the network for the mobile station via the pico cell based on, respectively, the granting or rejecting of the registration of the mobile station through the pico cell.

16. The method of claim 14, wherein:
    the registration and attempts at communications through the network via the pico cell are granted based on matching of a pico cell identifier included in the signaling message and a pico cell identifier indicated by the profile record associated with the MDN or MIN provisioned to the plurality of mobile stations including the mobile station, the pico cell identifier indicated by the profile record associated with the MDN or MIN provisioned to the plurality of mobile stations including the mobile station indicating that the mobile station authorized for service only through the identified pico cell is registering for communication through the identified pico cell; and
    the method further comprises billing a customer associated with the mobile station for the communications through the network via the identified pico cell in a manner different from billing for communications for other mobile stations through a macro cell of the mobile wireless communication network.

17. The method of claim 16, wherein the billing for the communications through the network via the identified pico cell is competitive with a landline telephone service.

18. The method of claim 14, wherein:
    the mobile directory number (MDN) is assigned to each mobile station of the plurality of mobile stations; and
    the retrieved profile record provides an association of the MDN to the identified pico cell.

* * * * *